UNITED STATES PATENT OFFICE.

GEORGE CHAMBERS HENRY, OF BURLINGTON, IOWA.

FOAM FOR CARBONATED BEVERAGES.

SPECIFICATION forming part of Letters Patent No. 419,671, dated January 21, 1890.

Application filed May 15, 1889. Serial No. 310,790. (No specimens.)

*To all whom it may concern:*

Be it known that I, GEORGE CHAMBERS HENRY, a citizen of the United States, residing at Burlington, in the county of Des Moines, in the State of Iowa, have invented a new and useful Enriching Composition for Carbonated Beverages, of which the following is a specification.

In the preparation and manufacture of ordinary soda-water and similar carbonated beverages plain water carbonated is mixed with sirups and flavors. It is usual and common to add other substances and liquids to the sirups and flavors—such as natural cream—and mix the same with the carbonated water, thereby rendering the beverage light and frothy and richer to the taste; but where cream or other material is thus added to enrich the beverage or give it body it is found that it at once absorbs and takes up a portion of the carbonic-acid gas introduced in the charged water drawn from the fountain or charging-tank, reducing the necessary and desirable proportion of gas in the beverage, removing much of its vitality, and tending to render it somewhat flat and incapable of retaining a uniform and homogeneous form of froth or foam, somewhat resembling whipped cream, for any appreciable time. Accordingly, I have discovered that by selecting and preparing an enriching-liquid of proper and nutritious material possessing the capability of absorbing and being charged with carbonic-acid gas and retaining the same for some appreciable period after being freed from the pressure of the charging tank or retort, and which will expand and develop into a creamy foam resembling the condition of whipped cream or the beaten white of eggs, and then mixing the same with carbonated water drawn from the tank in an open goblet or vessel, it produces a frothy or creamy condition in which the foamy condition of the enriching material, expanded under the influence of its own absorbed carbonic-acid gas, becomes thoroughly and uniformly permeated with the mixed and disseminated carbonated water drawn from the other fountain, forming a light and acceptable beverage in the form and shape and taste of a whipped cream of considerable consistency and material.

My composition for the enriching material to be used in the manner aforesaid in the preparation and manufacture of carbonated beverages consists of the following ingredients, combined in the proportion stated, viz: For a ten (10) gallon tank or retort or fountain, first, one-half (½) pint infusion or tincture of sarsaparilla-root, (or its equivalents for the purpose indicated may be employed, which consist of one-half (½) pint infusion or tincture bark of root quillaya or one-half (½) pound dextrine dissolved in one (1) gallon water;) second, one (1) gallon of the solution of gelatine, composed of six (6) ounces of gelatine to one (1) gallon of water; third, sirups, with or without flavors; fourth, water sufficient to properly fill the tank or retort, leaving sufficient space to agitate the mixture thoroughly; fifth, carbonic-acid gas in such quantity and proportion as the amount of liquid specified will absorb under the usual pressure employed in charging carbonated liquids.

It is not essential that the above proportion and quantity of either sarsaparilla, quillaya, or dextrine be strictly adhered to. It may vary to such an extent as may be desirable to make the foam more or less compact. Either two or three of the above-mentioned solutions may be employed in one preparation, in which case the proportionate amount of each is to be reduced to one-half or one-third the proportions given.

Before mixing and mingling it with carbonated water to be used as a beverage I prepare the enriching fluid or liquid, with or without sirups or flavors, in a separate and distinct carbonating tank or fountain, then drawing the same in proper quantities and mixing the same with carbonated water drawn from a separate and distinct fountain. The enriching-liquid retains its own absorbed carbonic-acid gas, and it forms a body of creamy foamy material, and by being thoroughly mixed with the carbonated water holds the same thoroughly and homogeneously throughout its structure, which it is enabled to retain for a sufficient time for its purpose and use.

What I claim, and desire to secure by Letters Patent of the United States, is—

The improved composition for enriching carbonated beverages, consisting of infusion or tincture of sarsaparilla or its specified equivalent, solution of gelatine, sirup, and water, and adapted to be carbonated, substantially as set forth.

GEORGE CHAMBERS HENRY.

Witnesses:
WM. HENDRICKS,
WM. N. LEY.